US008396780B1

(12) United States Patent
Witz et al.

(10) Patent No.: US 8,396,780 B1
(45) Date of Patent: Mar. 12, 2013

(54) COMMUNITY BASED FINANCIAL PRODUCT

(75) Inventors: Michael J. Witz, Los Angeles, CA (US); Brian A. Levy, Los Angeles, CA (US); Brian N. Sawyer, Santa Monica, CA (US); Dan Lin, Culver City, CA (US); Gordon K. Gustafson, Encino, CA (US)

(73) Assignee: eBay, Inc., San Jose, CA (US)

( * ) Notice: Subject to any disclaimer, the term of this patent is extended or adjusted under 35 U.S.C. 154(b) by 2433 days.

(21) Appl. No.: 09/599,051

(22) Filed: Jun. 21, 2000

(51) Int. Cl.
*G06Q 40/00* (2012.01)
(52) U.S. Cl. ......................................................... 705/37
(58) Field of Classification Search ............... 705/26, 705/35, 36 R, 36
See application file for complete search history.

(56) References Cited

U.S. PATENT DOCUMENTS

| | | | | |
|---|---|---|---|---|
| 5,537,586 | A * | 7/1996 | Amram et al. | 1/1 |
| 5,689,650 | A | 11/1997 | McClelland et al. | |
| 5,778,178 | A | 7/1998 | Arunachalum | |
| 5,784,696 | A * | 7/1998 | Melnikoff | 705/36 |
| 5,819,238 | A * | 10/1998 | Fernholz | 705/36 |
| 5,918,217 | A * | 6/1999 | Maggioncalda et al. | 705/36 |
| 5,987,500 | A | 11/1999 | Arunachalam | |
| 6,029,195 | A | 2/2000 | Herz | |
| 6,041,313 | A | 3/2000 | Gilbert et al. | |
| 6,049,783 | A * | 4/2000 | Segal et al. | 705/37 |
| 6,202,051 | B1 | 3/2001 | Woolston | |
| 6,212,556 | B1 | 4/2001 | Arunachalam | |
| 6,236,980 | B1 * | 5/2001 | Reese | 705/36 R |
| 6,260,019 | B1 | 7/2001 | Courts | |
| 6,338,047 | B1 * | 1/2002 | Wallman | 705/36 R |
| 6,349,290 | B1 * | 2/2002 | Horowitz et al. | 705/35 |
| 6,408,309 | B1 * | 6/2002 | Agarwal | 1/1 |
| 6,473,084 | B1 * | 10/2002 | Phillips et al. | 345/440 |
| 6,484,151 | B1 * | 11/2002 | O'Shaughnessy | 705/36 |
| 6,601,044 | B1 * | 7/2003 | Wallman | 705/36 |
| 6,996,539 | B1 * | 2/2006 | Wallman | 705/36 T |
| 2008/0215988 | A1 | 9/2008 | Witz et al. | |

OTHER PUBLICATIONS

U.S. Appl. No. 11/966,278, Non Final Office Action Mailed Oct. 1, 2009, 14 pgs.
U.S. Appl. No. 11/966,278, Response filed Dec. 30, 2009 to Non Final Office Action mailed Oct. 1, 2009, 10 pgs.
U.S. Appl. No. 11/966,278, Final Office Action mailed Apr. 29, 2010, 14 pgs.
U.S. Appl. No. 11/966,278, Preliminary Amendment filed Dec. 28, 2007, 3 pgs.
"U.S. Appl. No. 11/966,278, Advisory Action mailed Sep. 23, 2010", Advisory Action, 3 pgs.
"U.S. Appl. No. 11/966,278, Non Final Office Action mailed Dec. 28, 2010", 13 pgs.
"U.S. Appl. No. 11/966,278, Response filed Jun. 29, 2010 to Final Office Action mailed Apr. 29, 2010", 11 pgs.
"U.S. Appl. No. 11/966,278, Response filed Oct. 22, 2010 to Advisory Action mailed Sep. 23, 2010", 12 pgs.

* cited by examiner

*Primary Examiner* — Olabode Akintola
(74) *Attorney, Agent, or Firm* — Schwegman Lundberg & Woessner, P.A.

(57) ABSTRACT

A method of creating a financial product. A virtual community is established. Members of the community submit preferences to a server. The preferences are aggregated and manipulated to identify characteristics of the preferences. From the population of preferences submitted, a small subset is identified to be part of the financial product.

15 Claims, 7 Drawing Sheets

TABS & LINKS | TRANSACTIONS

| DATE | COMPANY | TICKER | ACTION | SHARES | AVG. PRICE |
|---|---|---|---|---|---|
| TODAY | ABC CORP | A | BUY | 200 | $100 |
| -- | -- | -- | -- | -- | -- |
| EARLIER DATE | XYZ CORP | X | SELL | 100 | $250 |
| -- | -- | -- | -- | -- | -- |
| EARLIEST DATE | XYZ CORP | X | BUY | 400 | $200 |

FIG. 5

TABS & LINKS | HOLDINGS

| COMPANY | TICKER | SHARES | CURRENT PRICE | AVG. PRICE | %CHG | $CHG | % OF PORT |
|---|---|---|---|---|---|---|---|
| ABC CORP | A | 400 | 106.13 | 74.57 | 41.76 | 12,448.00 | 1.5 |
| -- | -- | -- | -- | -- | -- | -- | -- |
| XYZ CORP | Z | 800 | 22.25 | 22.37 | -.54 | -96.00 | .51 |

Already have a screen name? Log On

Welcome to the StockJungle.com Community

1. You'll need a unique name to identify you in the Community.

Select a Screen Name: [        ]
    Select a Password: [        ]
    Re-Enter Password: [        ]
    E-mail: [        ]
    Referred By: [        ]
    (enter your friend's Screen Name)

2. We need this information to send you any Hot Hands Rewards you earn. (Concerned about your privacy? So are we, read our Privacy Statement)

First Name: [        ]
    Last Name: [        ]
    Address: [        ]
    City: [        ]
    State: [        ]
    Zip Code: [        ]

3. Please tell us a little bit more about yourself...we're the curious type.

Age: [    ] (optional)
    Gender: ○ Male ○ Female (optional)

4. Please provide us with a few words about your investment approach, background, and goals. (Be prudent, though, this personal profile will be visible for all to see)

Check the box to sign up for the FREE Jungle Weekly e-mail newsletter

By clicking submit below and registering for our Community Intelligence Arena, you are agreeing to be bound by our Terms of Service. In order to participate in the Hot Hands Rewards Program, you must be a U.S. citizen over the age of 18. Please review the full instructions and rules for more information. We are committed to protecting the privacy of our Community members, please read our Privacy Statement for more information.

[SUBMIT]

FIG. 6

Questions? We've Got Answers
© 2000, StockJungle.com Inc.
Privacy Statement | Terms of Service | Legal Stuff

FIG. 7

NEWS | ABOUT | HELP

COMPANY NAME:
TICKER SYMBOL:

This trade is a:
◉ BUY - LONG
◉ SELL - SHORT

The STYLE that best describes this pick is:
◉ Fundamental
◉ Technical
◉ Momentum
◉ Value
◉ Cocktail Party Tip The expected TIME FRAME for this stock pick is:
◉ Less than one week
◉ Less than one month
◉ Between one and six months
◉ Between six months and one year
◉ More than one year

ANALYSIS:

[SUBMIT]

Questions? We've Got Answers
© 2000, StockJungle.com Inc.
Privacy Statement | Terms of Service | Legal Stuff

FIG. 8

COMMUNITY BASED FINANCIAL PRODUCT

BACKGROUND (1) Field of the Invention

The invention relates to financial products. More specifically, the invention relates to financial products derived from the input of a virtual community.

(2) Background

Mutual funds of various types are ubiquitous within the investment community. Typical mutual fund companies employ a fund manager to establish and manage the portfolio securities that constitute the fund. Investment decisions for the fund are made by that fund manager, while investors at large are relegated to a passive or a non-participatory function. Moreover, such funds typically release information on fund holdings and transactions on a quarterly basis with only limited detail regarding the transactions conducted during that quarter. Moreover, by the time these quarterly reports actually reach investors in the fund, information contained in the report is largely obsolete.

While the long bull market of recent years has lead to a proliferation of mutual funds, it has also lead to a proliferation of on-line investors that are technologically savvy and able to avail themselves of vast research resources that the Internet provides. This proliferation has been reflected in increasing ranks of day traders and overall security volume attributable to non-institutional investors.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
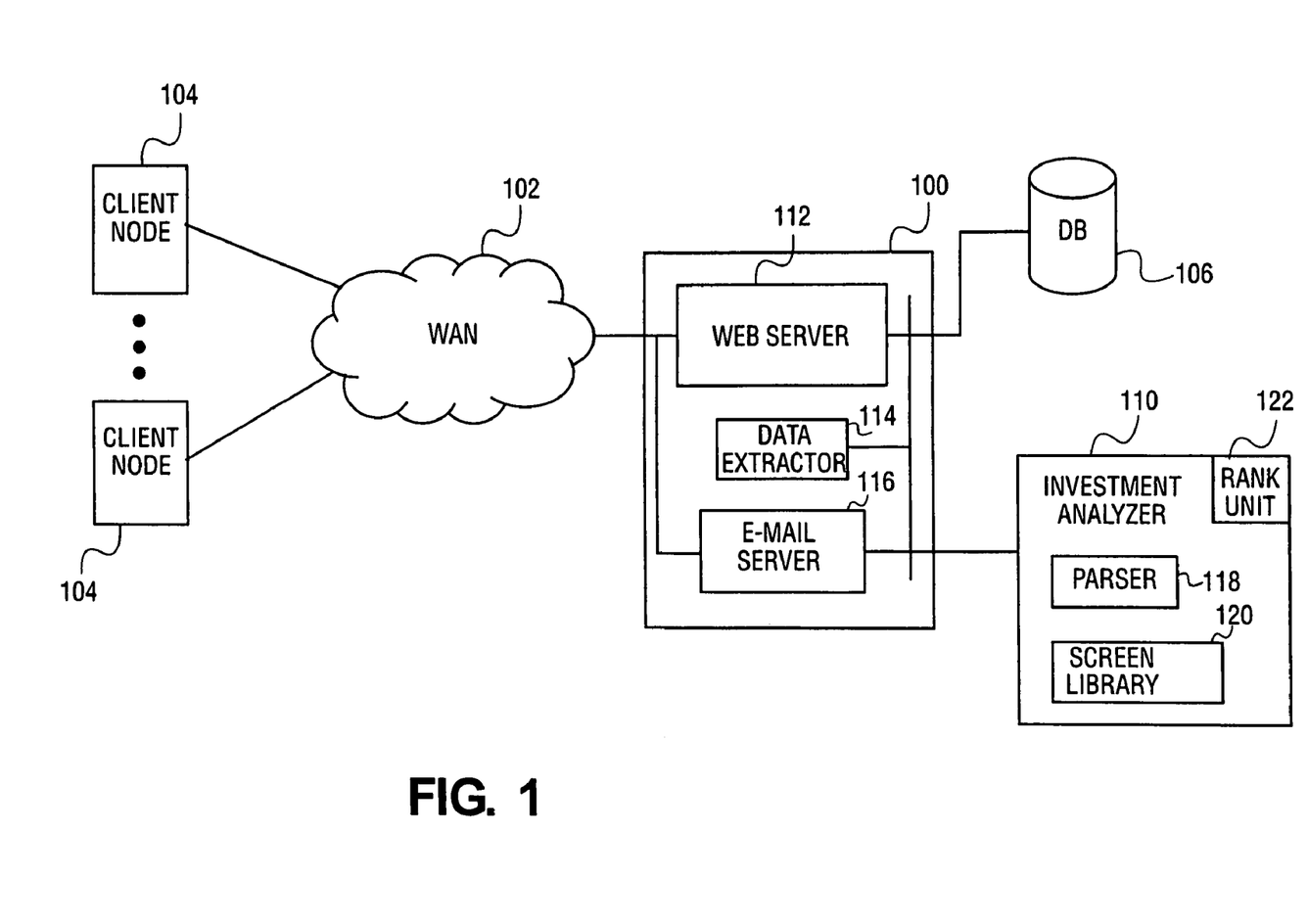
FIG. 1 is a block diagram of a system of one embodiment of invention

FIG. 1 is a block diagram of a system of one embodiment of invention. A server node 100 is coupled to a wide area network (WAN) 102 such as the Internet. Also coupled to WAN 102 are plurality of client nodes 104. Client node 104 may be a personal computer (PC), a web enabled phone, a set top box, or any other conventional manner in which a user may connect to a WAN. Server node 100 is also coupled to a database 106 and an investment analyzer 110. The server node 100 includes a web server to serve web pages, and receive completed templates from client nodes 104. The server node 100 tracks preferences submitted by a virtual community made of a population of users which connect from client nodes 104 through WAN 102 to the server node 100. The virtual community is based around securities investment, and one embodiment equities investment.

Each member of the population that makes up the virtual community initially creates a personal profile. When a new user first accesses server node 100, the server node 100 serves a web page, typically a hypertext mark up language (HTML) page, including a link to join the community. By accessing the link, the user causes a request to be sent from client node 104 across the WAN 102 or server node 100 to return a registration template that the user may fill out to become a member of the community. A typical registration template will include explanatory text, and a plurality of user modifiable fields to permit the users to enter information required to establish the user profile. Upon submission of the completed template, a data extractor 114 within the server node 100 extracts the data required to complete the user profile. In the event that one or more required fields are inadequately completed, the server node 100 may return the template with instructional messages regarding the inadequacy of the information provided. If the template has been appropriately completed, the user becomes a community member with a profile established and stored in the database 106. Database 106 may be a relational database such as an Oracle-style database or may include one or more of such databases with or without links between them.

Once the user profile is established, the user may be offered the opportunity to submit user preferences. As used in this context, the user preferences refer to the user's security picks from the universe of possible securities available in the market. In some embodiments, certain restrictions may be placed on user preferences, such as limiting the preferences to a particular exchange or class of securities. Upon receipt of a preference, from a user, the data extractor 114 extracts the preference information and formats it as an e-mail. An e-mail server 116 within the server node 100 provides those preferences to the investment analyzer 110 which aggregates that preference with all the previously received preferences. The investment analyzer 110 may include a parser 118 to parse the incoming e-mail to retrieve specific information such as the submitting analyst and security can be identified. The investment analyzer may also include a plurality of automatic screens to screen the preferences for various objectively determinable characteristics. Then, the aggregated list of preferences may be used as a basis for the formation of the financial product such as a mutual fund or a newsletter.

In the case of a newsletter, the preferences may be aggregated and statistically manipulated based on such factors as ranking within the population of the analysts. Submitting users are referred to interchangeably herein as "analysts." In one embodiment, the statistical aggregation is combined with analyst reports from high-ranking analysts, which may include specific recommendations. It is envisioned that the newsletter may be distributed either as hard copy or electronically.

In the case of a mutual fund, the constituent positions of the fund are selected by a series of screenings of the aggregation of preferences. In this manner, a fund is established based on the intelligence of the community. The effectiveness of selecting mutual fund positions from the preferences of the community depends, in large part, on having a good pool of preferences submitted. To encourage community members to submit their best preferences, a reward structure may be established to incent those members submitting the best performing preferences over a predetermined period of time. The predetermined period may call for rewards daily, weekly or some other established time frame. In one embodiment, the reward structure further includes an incentive for referring those individuals who subsequently are identified as having selected the best performing picks. To that end, the investment analyzer may include a rank unit 122 that ranks preferences submitted by each analyst to establish which analysts should receive the reward for each reward period. In one embodiment, the ranking is based on a comparison between the real world performance of all the analysts' preferences compared with the performance of the other analysts preferences during a particular time window.

As previously noted, traditional mutual funds provide only limited information about fund holdings and fund transactions which by the time disseminated, is largely obsolete. By virtue of its origin in the virtual community, dissemination of fund information electronically for a fund such as described above, is both practical and efficient. This permits rapid, on-demand dissemination of current fund information. To that end, retained in database 106 and served by server 100 upon request to the respective users at the different client nodes 104 are current listings of fund holdings and listings of fund transactions. Funds providing access to such information are referred to herein as "naked" funds. Naked funds need not be community originated funds. Rather, funds managed in the traditional manner may be naked if current transactions and holdings information is posted and regularly updated to be available over the WAN. Typically, in one embodiment of the invention, the transaction and holdings listings are updated at the end of each business day. In another embodiment, the listings are updated in substantial real time, or several times per day. In any event, the timeliness of the listings should be substantially higher than that available in a typical mutual fund reporting in traditional quarterly reports.

Figure 2:
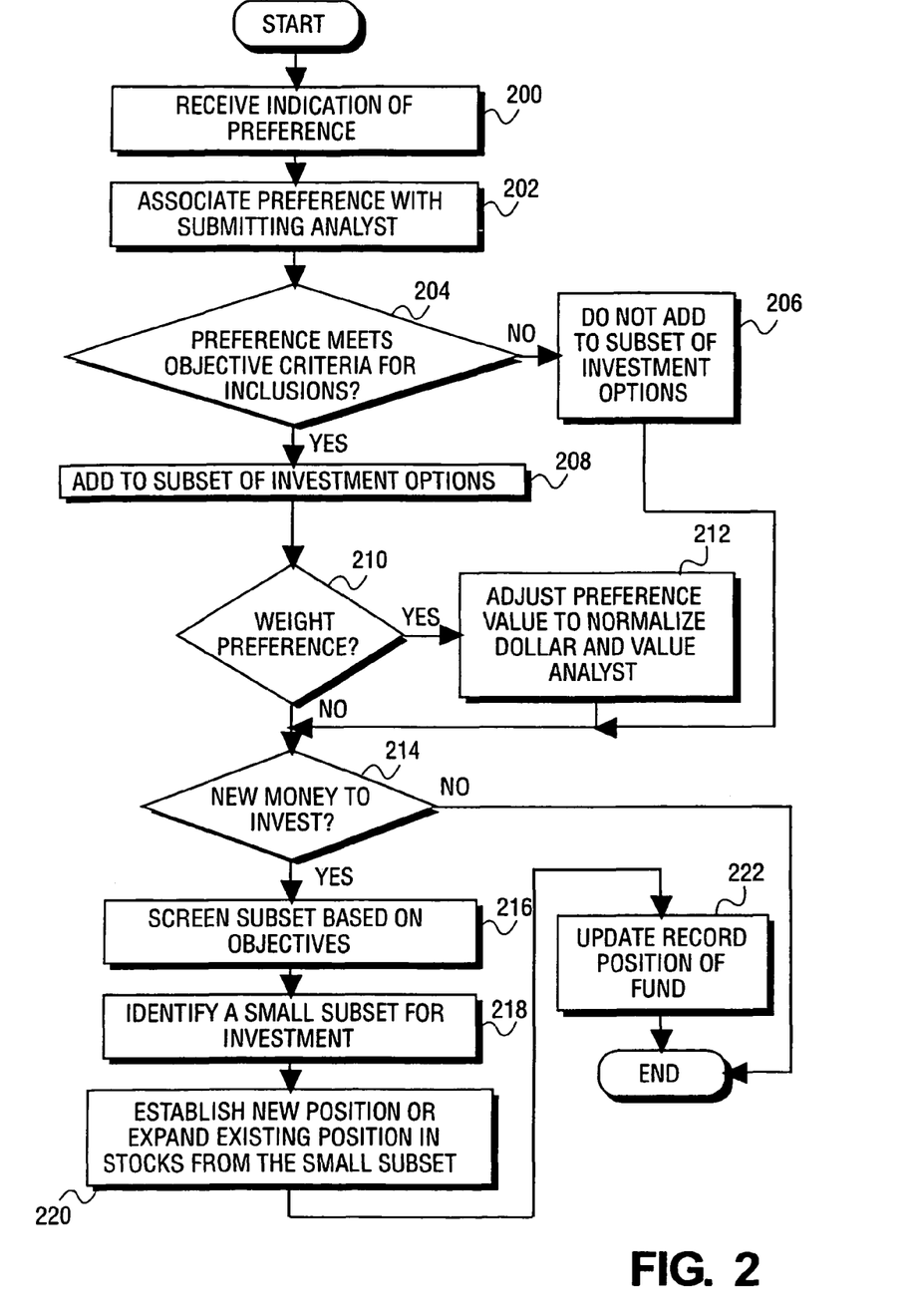
FIG. 2 is a flow diagram of operation in the investment analyzer in one embodiment of the invention.

FIG. 2 is a flow diagram of operation in the investment analyzer in one embodiment of the invention. A preference is received at functional block 200. At functional block 202, the preference is associated with the submitting user (analyst). This association may include associating the analyst current ranking within the community. Ranking of analysts is discussed in more detail below.

A determination is made at decision block 204 if the preference meets objective criteria for inclusion. Such objective criteria may include, by way of example and not limitation, market capitalization, security class, current price, average daily trading volume, and any other easily ascertainable objective criterion. For example, if the mutual fund to be derived is to be a technology fund, a Hilton Hotels preference would be found at decision block 204, not to meet the objective criteria. If a preference does not meet the objective criteria at decision block 204, it is not added to the subset of investment options at functional block 206. If the preference meets the objection criteria at decision block 204 is added to the subset investment options at a functional block 208.

A decision is made at decision block 210 if the preference should be weighted. If the preference should be weighted, the preference value is adjusted to normalize, e.g., dollar and analysts ranking at functional block 212. In one embodiment, the weighting takes the form of compiling a list of unique ticker symbols submitted as preferences. Each unique ticker symbol is then equal dollar weighted. The resulting number of shares is multiplied by the frequency the preference was submitted by members of the community. The resulting value is termed a population weighted scale (PWS). The above described PWS provides an indication of the overall all community opinion. Some embodiments of the invention may factor in analyst ranking in generating the PWS. Other embodiments do not, but may subsequently screen out preferences of poorly performing analysts in determining what positions to establish.

At decision block 214, a determination is made if there is new money to invest. In this context, "new money" may be either from inflows of cash into the fund or prior sale of some fund holding. If there is new money to invest, the subset is screened based on objectives of the mutual fund. By way of example, a value fund may screen out high P/E stocks while a growth fund may screen out stocks that have not exhibited average annual growth rate and/or accelerating growth above a predetermined level. From this screening, a relatively small subset, for example, fifty stocks, down from, e.g., one thousand stocks is identified at functional block 218. Through the screening, this smaller subset may be automatically forced to have fundamental characteristics approximating the PWS. Fundamental characteristics may include a subset of, e.g., P/E ratio, market capitalization, beta price to book ratio, etc. By comparing the portfolio with a benchmark such as the S&P 500, and dollar weighting accordingly a determination can be made whether a particular area is underweighted or overweighted. At functional block 220, the subset is further reduced to identify a number of securities in which to establish new or expand existing positions consistent with the desired balance of the fund. Portfolio weighting may be factored into the determination of the reduced subset. At functional block 222, the database listing reflecting fund holdings and transactions are updated based on changes in positions at functional block 220.

If there is no new money to invest at decision block 214, the process terminates until resumed by additional preferences or cash inflows are received. Notwithstanding any implications to the contrary, there is no necessity that a new preference be received for a position to be established (or expanded), rather, as new money to invest arrives, or sales from the existing portfolio generate cash to be reinvested (treated herein as new money to invest), the foregoing analysis may be ran on the existing aggregation of preferences as retained and dynamically changing within the database. In this manner, the mutual fund is established and each position contained within the mutual fund necessarily originated as a preference from at least one member of the community. Periodically, the portfolio may need to be rebalanced. By comparing the existing portfolio with a target portfolio, the desirability of retaining current holding versus swapping out for some other security in the population is determined.

Figure 3:
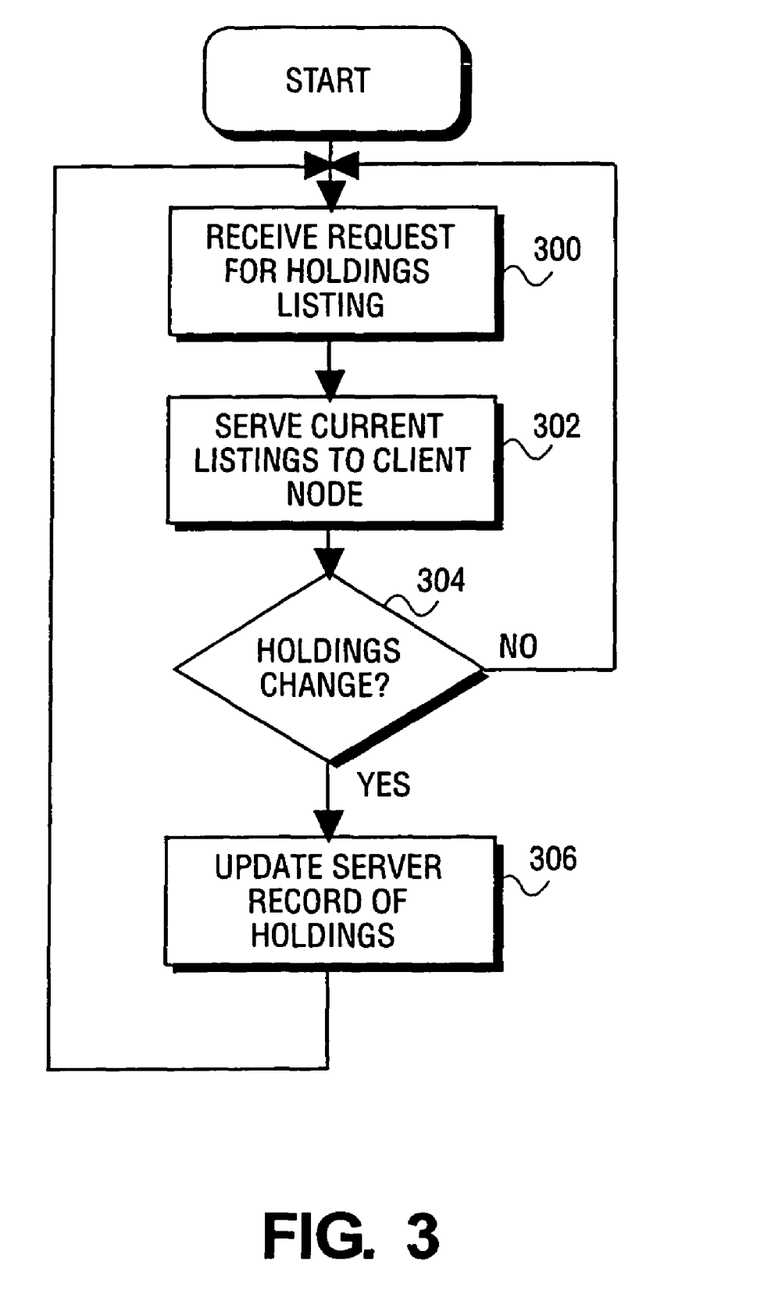
FIG. 3 is a flow diagram of operation of the server node responsive to a request for a holdings listing

FIG. 3 shows operation of the server node responsive to a request for a holdings listing. At functional block 300, a request for a holdings listing is received at the server node. The server serves a current listing to client node at functional block 302. A decision block 304, if a determination is made, holdings have changed since the last current listing. If they have changed, the server updates the record of the holding at functional block 306. In this manner, the next requesting user receives the, then, most current holdings listing. In some of the embodiments of the invention, such updates may occur in real time. In other embodiments, it may be updated at the end of each business day. In this manner, the server node leverages the ability of the WAN to disseminate information rapidly to permit the essentially current dissemination of mutual funds holding information to investors. An analogous order of operation is performed responsive to a request for current transactions. By permitting users substantially direct access to both holdings and transactions of the fund, the user is provided greater information on which to base investment decisions.

Figure 4:
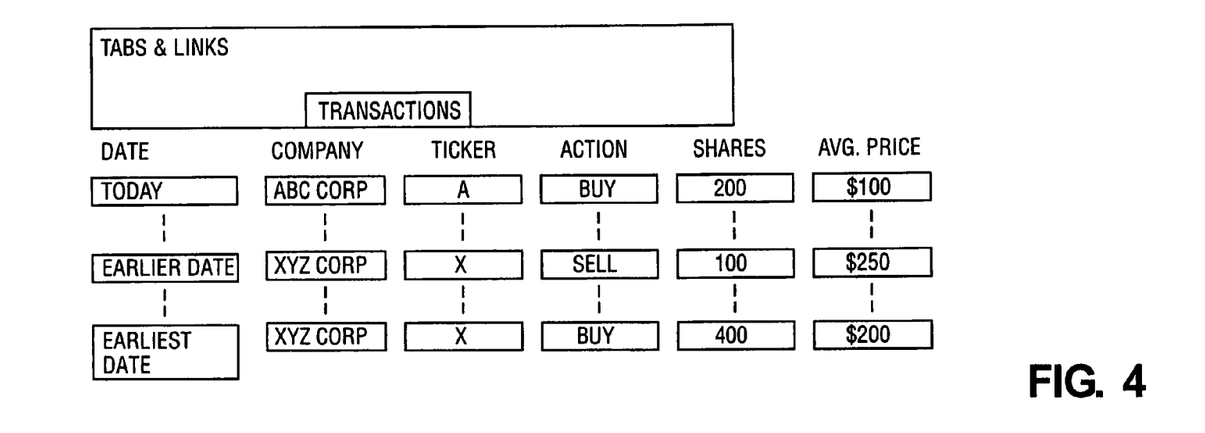
FIG. 4 is a schematic diagram of a transaction listing that might be served by the server node of one embodiment of the invention.

FIG. 4 is a schematic diagram of a transaction listing that might be served by the server node of one embodiment of the invention. In this embodiment, transaction information is available from inception to the current date. Moreover, it is envisioned that transaction data may be specified to be retrieved for a particular period of time such as one month, six months, or for user's specified date range. The listing provides date of transaction, company, ticker symbol, action taken, number of shares, and average price. In one embodiment, each column heading is a link reactivation of which causes the listing to be sorted by that column. For example, clicking on the "date" link would cause the listing to appear date ordered, as shown. However, clicking on the company link would result in, for example, an alphabetical listing rather than a date ordered listing. Typically, the sorting would occur one server node and a new page reflecting the listing with the specified sort would be served to the client nodes.

Figure 5:
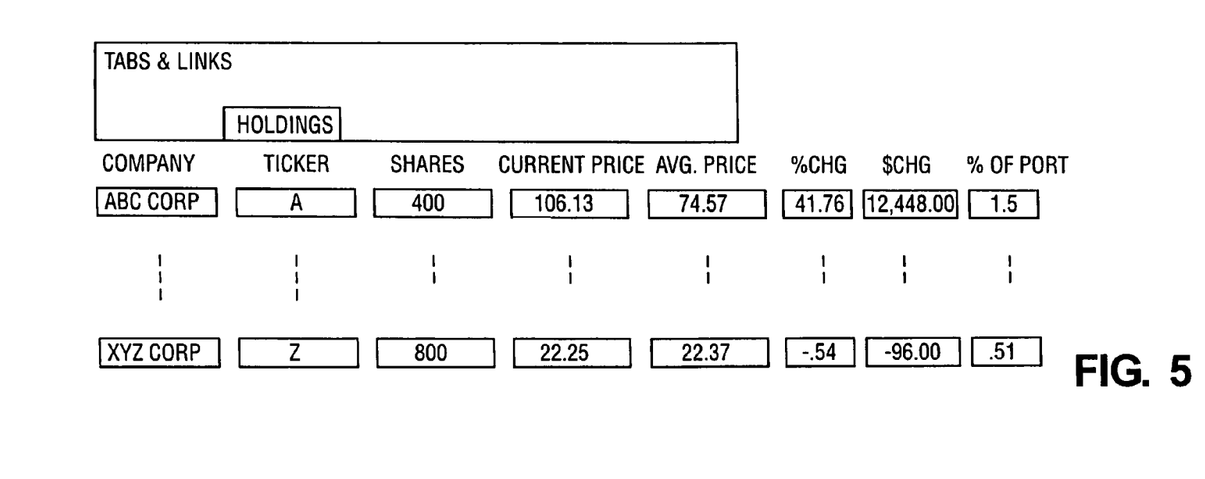
FIG. 5 is a schematic diagram of a holdings listing in one embodiment of the invention.

FIG. 5 is a schematic diagram of a holdings listing in one embodiment of the invention. The holdings is similar to the transaction listing, only providing different information. Specifically, the holdings listing provides the current holdings of the fund. The holdings listing may be updated in realtime, or on an intermittent basis, such as after the market closes on each business day. In this embodiment, the information provides in the holdings listing includes the company, the ticker symbols, the number of shares held, the current price, the average purchase price for the position, the percent change, the average purchase price dollar change, and the percent of the portfolio represented by the position. Also similar to the transaction listing, the various column headings may be instantiated as links, the activation of which causes the server node to serve a page sorted on that column.

Figure 6:
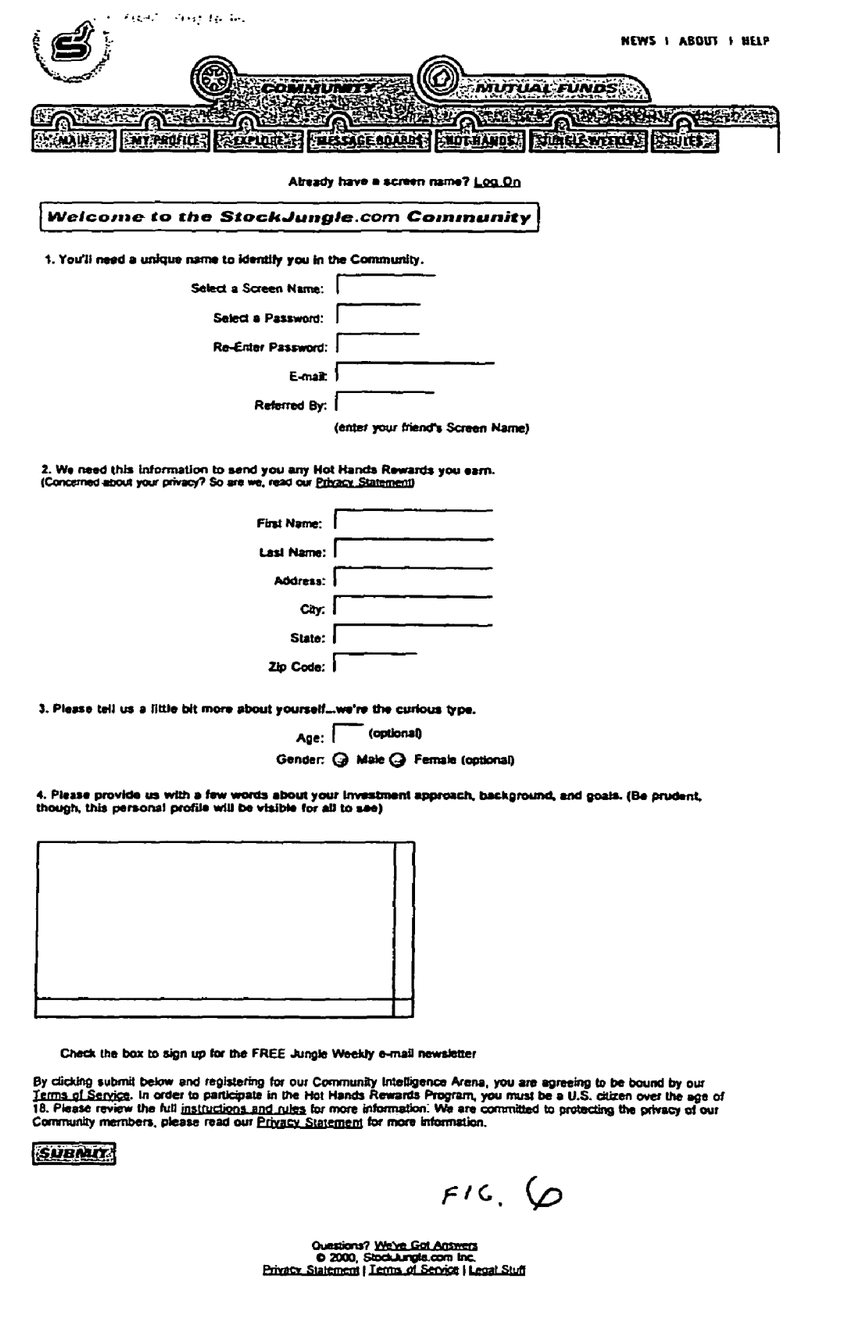
FIG. 6 is an example template used to join the community in one embodiment of the invention.

FIG. 6 is an example template used to join the community in one embodiment of the invention. Base on the on the information provided in such a template, a personal profile is established.

Figure 7:
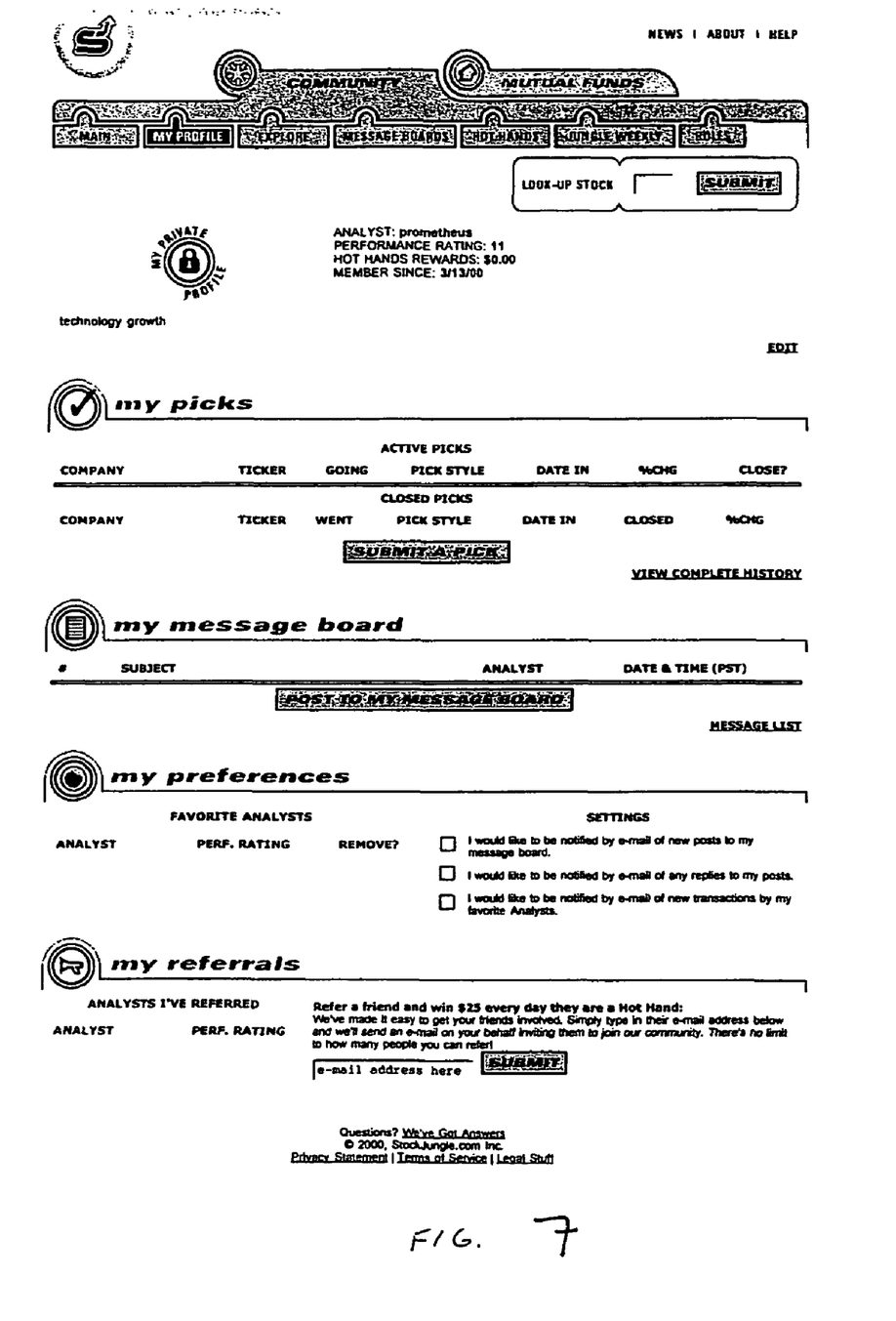
FIG. 7 is a an example page reflecting a personal profile established.

FIG. 7 is a page reflecting a personal profile established. From this personal profile page, a link exists activation of which permits the user to submit a pick. Responsive to the activation of that link, the server serves a template through which the user may submit its preferences.

Figure 8:
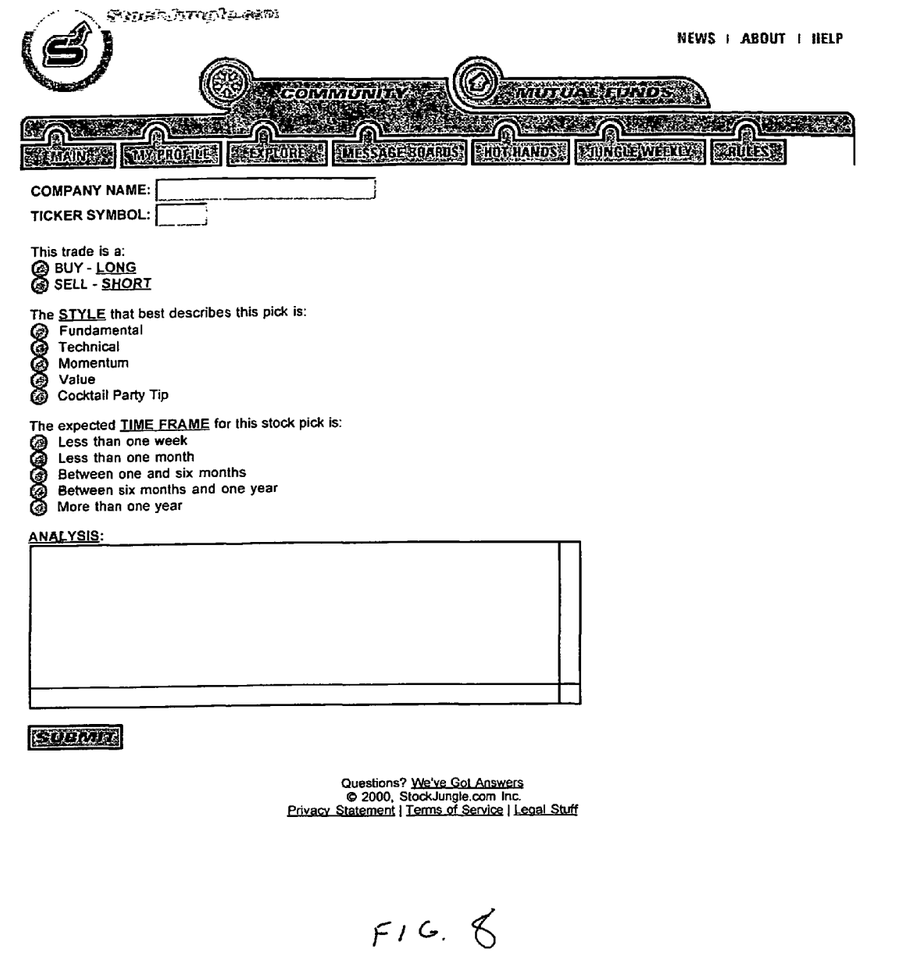
FIG. 8 shows a template through which an analyst may submit a preference in one embodiment of the invention.

FIG. 8 shows a template through which an analyst may submit a preference in one embodiment of the invention. The information extracted from this template once returned to the server node may be forwarded on to the investment analyzer to aid in the creation of a mutual fund, or other than a financial product.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A machine-implemented method comprising:
receiving, from a device of a first user over a wide-area network, an indication of a preference of a weighted apportionment of assets for a set of investments, the first user being a member of a first population of users, which are members of a virtual community identified as investment analysts;
aggregating the preference into a database of previously received preferences from the first population, the aggregation being an updated set of preferences;
adjusting the updated set of preferences according to a population-weighted-scale; and
deriving, according to the adjusted set of preferences, an investment position in a financial product for a second user, the second user is a member of a second population of users identified as investors, and the financial product is a mutual fund.

2. The method of claim 1 further comprising:
associating with each preference in the set of preferences, a ranking of each submitting user; and
screening the set of preferences based on the ranking.

3. The method of claim 1 wherein deriving comprises:
identifying within the set of preferences a first subset of preferences having a capitalization and a trading volume consistent with a set of investing objectives of the mutual fund.

4. The method of claim 3 further comprising:
screening the first subset of preferences based on a ranking of the first user to create a second subset of preferences.

5. The method of claim 1 wherein each previously received preference represents a stock in a model portfolio for each member of the first population of users, the method further comprising:
ranking the model portfolio relative to a population of model portfolios; and
providing rewards, based on a reward structure, to each submitting member of the first population of users of high performing model portfolios.

6. The method of claim 1 further comprising:
receiving from an investor currency units to be invested in the mutual fund;
adding an identified investment to the mutual fund, the investment identified based on screening the set of preferences for an investment complying with a set of investing objectives of the mutual fund; and
establishing a new position the mutual fund based on the identified investment.

7. The method of claim 1 further comprising:
receiving a request over the wide-area network for information about the mutual fund; and
serving a page reflecting current holdings of the mutual fund over the wide-area network.

8. The method of claim 1, wherein the first user selects the preference of a weighted apportionment of assets for the set of investments.

9. The method of claim 1, wherein the investment position is a financial liability balanced across the weighted apportionment of assets according to the population-weighted-scale.

10. A machine-implemented method comprising:
receiving, from a device of a first user over a wide-area network, an indication of a preference of a weighted apportionment of assets for a set of investments, the first user being a member of a first population of users, which are members of a virtual community identified as investment analysts;
aggregating the preference into a database of previously received preferences from the first population, the aggregation being an updated set of preferences;
adjusting the updated set of preferences according to a population-weighted-scale; and
deriving, according to the adjusted set of preferences, an investment position in a financial information product for a second user, the second user is a member of a second population of users identified as investors, and the financial information product is a newsletter.

11. The method of claim 10 further comprising:
   screening the set of preferences to generate a recommended list of investments.

12. The method of claim 11 wherein the screening is based on at least one of:
   ranking for the first user, class of securities in the recommended list of investments, capitalization, average trading volume, price to earnings ratio, return on investment, gross margin, and revenue growth rate over a selected time period; and
   generating an analyst report for the first user that satisfies the investing objectives of the newsletter.

13. The method of claim 12 further comprising:
   distributing the newsletter electronically; and
   updating the analyst report and recommended list of investments with a frequency greater than weekly.

14. The method of claim 10, wherein the first user selects the preference of a weighted apportionment of assets for the set of investments.

15. The method of claim 10, wherein the investment position is a financial liability balanced across the weighted apportionment of assets according to the population-weighted-scale.

* * * * *

UNITED STATES PATENT AND TRADEMARK OFFICE
CERTIFICATE OF CORRECTION

PATENT NO. : 8,396,780 B1
APPLICATION NO. : 09/599051
DATED : March 12, 2013
INVENTOR(S) : Witz et al.

It is certified that error appears in the above-identified patent and that said Letters Patent is hereby corrected as shown below:

In the Specifications

In column 1, line 39, after "invention", insert --.--, therefor

In column 1, line 43, after "listing", insert --.--, therefor

In column 1, line 51, after "is", delete "a", therefor

In column 2, line 38, delete "that" and insert --the--, therefor

In column 3, line 10, delete "analysts" and insert --analysts'--, therefor

In column 3, line 53, delete "204" and insert --204, it--, therefor

In column 4, line 52, delete "A" and insert --At--, therefor

In column 5, line 34, after "Base", delete "on the", therefor

Signed and Sealed this
Ninth Day of July, 2013

Teresa Stanek Rea
*Acting Director of the United States Patent and Trademark Office*